United States Patent [19]
Johnson et al.

[11] Patent Number: 5,383,640
[45] Date of Patent: Jan. 24, 1995

[54] SEAT POSITION ADJUSTING APPARATUS

[75] Inventors: Richard F. Johnson, Bloomfield Hills; Gregory S. Miller, Northville, both of Mich.

[73] Assignee: Douglas & Lomason Company, Farmington Hills, Mich.

[21] Appl. No.: 123,332

[22] Filed: Sep. 17, 1993

[51] Int. Cl.[6] ............................................. A47G 29/00
[52] U.S. Cl. .................................. 248/372.1; 248/395
[58] Field of Search .................. 248/372.1, 394, 395, 248/396, 429, 430, 421; 297/317, 318

[56] References Cited

U.S. PATENT DOCUMENTS

| | | | |
|---|---|---|---|
| 2,091,088 | 8/1937 | Whedon et al. | 248/395 |
| 2,161,367 | 6/1939 | McGregor | 248/395 |
| 2,261,728 | 11/1941 | Lawler | 248/395 |
| 2,978,009 | 4/1961 | Weberman | 248/395 |
| 2,980,163 | 4/1961 | Pickles | 248/395 |
| 3,008,681 | 11/1961 | Matthews | 248/395 |
| 3,662,984 | 5/1972 | Robinson et al. | |
| 4,159,095 | 6/1979 | Pallant et al. | |
| 4,222,543 | 9/1980 | Gedig et al. | |
| 4,325,527 | 4/1982 | Berneking | |
| 4,422,611 | 12/1983 | Kitsuda | |
| 4,482,120 | 11/1984 | Fudala | |
| 4,487,390 | 12/1984 | Miyashita | |
| 4,529,158 | 7/1985 | Sautter, Jr. | |
| 4,648,578 | 3/1987 | Sakamoto | |
| 4,721,277 | 1/1988 | Hessler et al. | |
| 4,828,213 | 5/1989 | Saito et al. | |
| 4,893,774 | 1/1990 | Corneail | 248/372.1 X |
| 5,005,894 | 4/1991 | Nagata | |
| 5,145,232 | 9/1992 | Dal Monte | |
| 5,207,480 | 5/1993 | Johnson et al. | |

FOREIGN PATENT DOCUMENTS

| | | | |
|---|---|---|---|
| 2419988 | 11/1975 | Germany | 248/394 |
| 593544 | 10/1947 | United Kingdom | 248/395 |
| 1403897 | 8/1975 | United Kingdom | 248/394 |

*Primary Examiner*—J. Franklin Foss
*Attorney, Agent, or Firm*—Harness, Dickey & Pierce

[57] ABSTRACT

A vehicular seat having an adjustment apparatus for horizontally and vertically positioning the seat is provided. The adjustment apparatus includes a four bar mechanism that extends from a base and supports cushioned seat members. As the four bar mechanism is articulated with respect to the base, the seat members supported thereon are moved vertically and horizontally between elevated forward positions and lowered rearward positions. The adjustment mechanism also includes a spring for storing a portion of the energy exerted while seat members are moved from an elevated forward position to a lowered rearward position. Energy stored within the spring is used to assist lifting the seat members and the occupant therein as the seat is elevated.

17 Claims, 4 Drawing Sheets

SEAT POSITION ADJUSTING APPARATUS

BACKGROUND AND SUMMARY OF THE INVENTION

1. Technical Field

This invention relates generally to a position adjustable vehicular seat and, more particularly, to a position adjusting apparatus which utilizes a spring biased four bar mechanism for adjusting the horizontal and vertical position of the seat.

2. Description of the Art

Vehicular seats are often provided with an adjustment mechanism to vertically and horizontally position the seat for occupant comfort. Such an adjustment mechanism may include a plurality of links that are pivotally coupled to a base that is in turn mounted to the vehicle floor. These links are configured for articulation with respect to the base such that a cushioned seat assembly pivotally supported by the links can be articulated to a desired position by the occupant. Typically, such position adjustable vehicular seats can be adjusted either manually with an elongated lever or by an electrically controlled motor driven system.

In seats equipped with a manually actuated mechanism, the seat occupant is required to overcome his/her own weight in combination with weight of the seat in order to elevate the seat. Thus, an elongated lever, such as a telescoping lever or the like, is typically connected to the links such that when a relatively small load is applied to the distal end of the lever, the mechanical advantage of the lever provides the much larger force necessary to articulate the links and elevate the seat. In an automated seat adjustment system, electric torque motors are utilized to drive cams or clutch mechanisms in order to elevate the weight of both the seat and the occupant. With either of these types of vertical adjustment mechanisms, it would be desirable to eliminate the need for a seat occupant to manipulate the cumbersome elongated lever or the relatively expensive and complicated componentry associated with an automated system.

SUMMARY OF THE INVENTION

In order to overcome the aforementioned disadvantages, a unique position adjusting apparatus for a vehicular seat is provided. This adjusting apparatus primarily includes a four bar mechanism that extends from a base affixed to the vehicle floor. The four bar mechanism supports a cushioned seat assembly and is configured for articulation between elevated forward positions and lowered rearward positions with a single adjustment operation. The adjusting apparatus is further provided with an energy storing spring. This spring stores a portion of the energy exerted when the cushioned seat assembly is moved from elevated forward positions to lowered rearward positions. When an occupant desires to return the seat to an elevated forward position, energy stored within the spring is utilized to assist lifting both the weight of the occupant and the vehicular seat. Thus, the need for a cumbersome lever or an automated electric lifting mechanism is eliminated.

Further objects and advantages of the present invention will be apparent from the following description, reference being made to the accompanying drawings wherein a preferred embodiment of the present invention is clearly shown.

DETAILED DESCRIPTION OF THE PREFERRED EMBODIMENT

Figure 1:
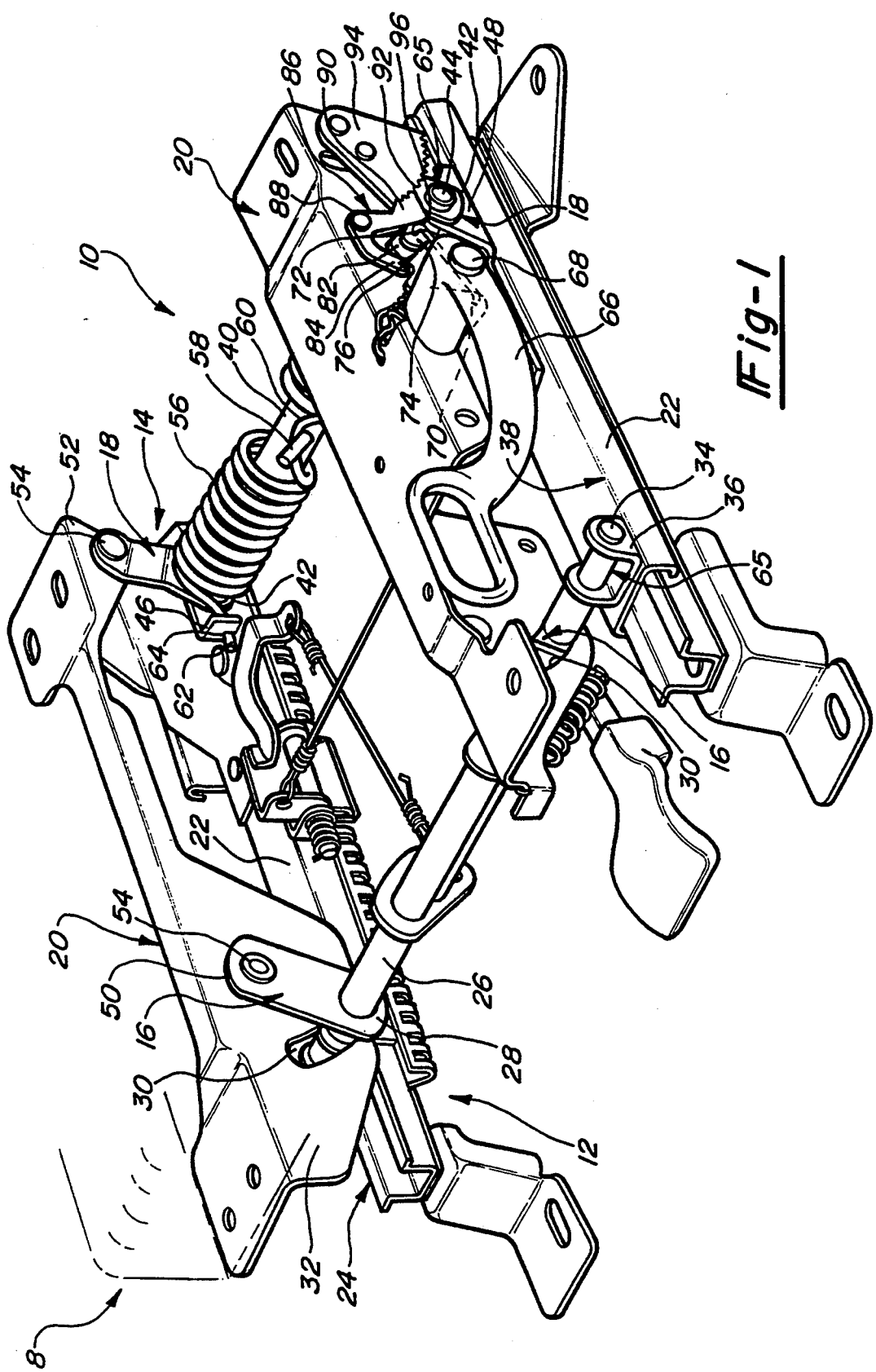
FIG. 1 is a perspective view of the position adjusting apparatus of the present invention mounted upon a conventional fore/aft sliding seat track assembly which attaches to the floor of the vehicle, in this particular embodiment the adjustment apparatus is shown latched in an elevated forward position.

Referring now to the drawings, and more particularly to FIG. 1, a vehicular seat 8 having the position adjusting apparatus 10 of the present invention is shown. In this particular embodiment, adjusting apparatus 10 is mounted upon a conventional incrementally adjustable fore/aft seat adjustment assembly 12. Seat adjustment assembly 12 is shown to include a pair of stationary base segments 13 fixed to the vehicle floor (not shown) and a pair of sliding carriage rails 15 retained for sliding longitudinal movement thereon. The operable portion of position adjusting apparatus 10 is a spring-loaded four bar mechanism 14 that extends upwardly from carriage rails 15 of fore/aft sliding seat adjustment assembly 12. As will be described hereinafter, this spring-biased four bar mechanism 14 articulates upon carriage rails 15 such that a cushioned seat assembly (not shown) supported by four bar mechanism 14 can be vertically and horizontally positioned in one operation. Moreover, spring-biased four bar mechanism 14 eliminates the manual manipulation of an elongated lever for mechanically actuating the four bar mechanism and also eliminates the necessity for an automated system that uses electric torque motors in combination with cams or clutches to actuate the four bar mechanism. Rather, four bar mechanism 14 of the present invention is spring-biased to assist in the articulation of the cushioned seat assembly (not shown) between elevated forward positions and lowered rearward positions.

Spring-biased four bar mechanism 14 is defined by a first pair of links 16 and a second pair of links 18 which extend between upper mounting brackets 20 and lower carriage rails 15. The first pair of links 16 are located at a forward portion 24 of vehicular seat 8 and are both rigidly affixed to a transversely extending front crossbar 26 at their lower ends 28. Front crossbar 26 passes through and extends from lower ends 28 of links 16 to operatively engage slots 30 in forward portions 32 of upper mounting brackets 20. A distal tip 34 on each end of forward crossbar 26 protrudes from slot 30 and is journalled for rotation within a bearing bracket 36 mounted upon an upper surface 38 of carriage rail 15. Thus, first pair of links 16 and front crossbar 26 are pivotally coupled with respect to sliding carriage rail 15 and can be articulated as a single unit with respect thereto.

Likewise, the second pair of links 18 are rigidly affixed to a transversely extending rear crossbar 40 at their lower ends 42. One distal tip of rear crossbar 40 passes through lower end 42 of one of links 18 and is journalled for rotation within a first rear bearing bracket 46. Similarly, the other distal tip of rear crossbar 40 first passes through a second rear bearing bracket 48, and is journalled for rotation with respect thereto, before passing through lower end 42 of its corresponding rear link 18. Thus, as best illustrated by viewing FIGS. 2 and 4, second pair of links 18 and rear crossbar 40 are pivotally coupled to sliding carriage rail 15 and are able to freely articulate as a unit with respect thereto. Note, front crossbar 26 and rear crossbar 40 are preferably of a tubular configuration in order to optimize strength while maintaining a minimum amount of mass. Moreover, front crossbar 26 and rear crossbar 40 provide synchronous articulated movement of the laterally-spaced four bar linkage associated with each side of position adjusting apparatus 12.

Figure 2:
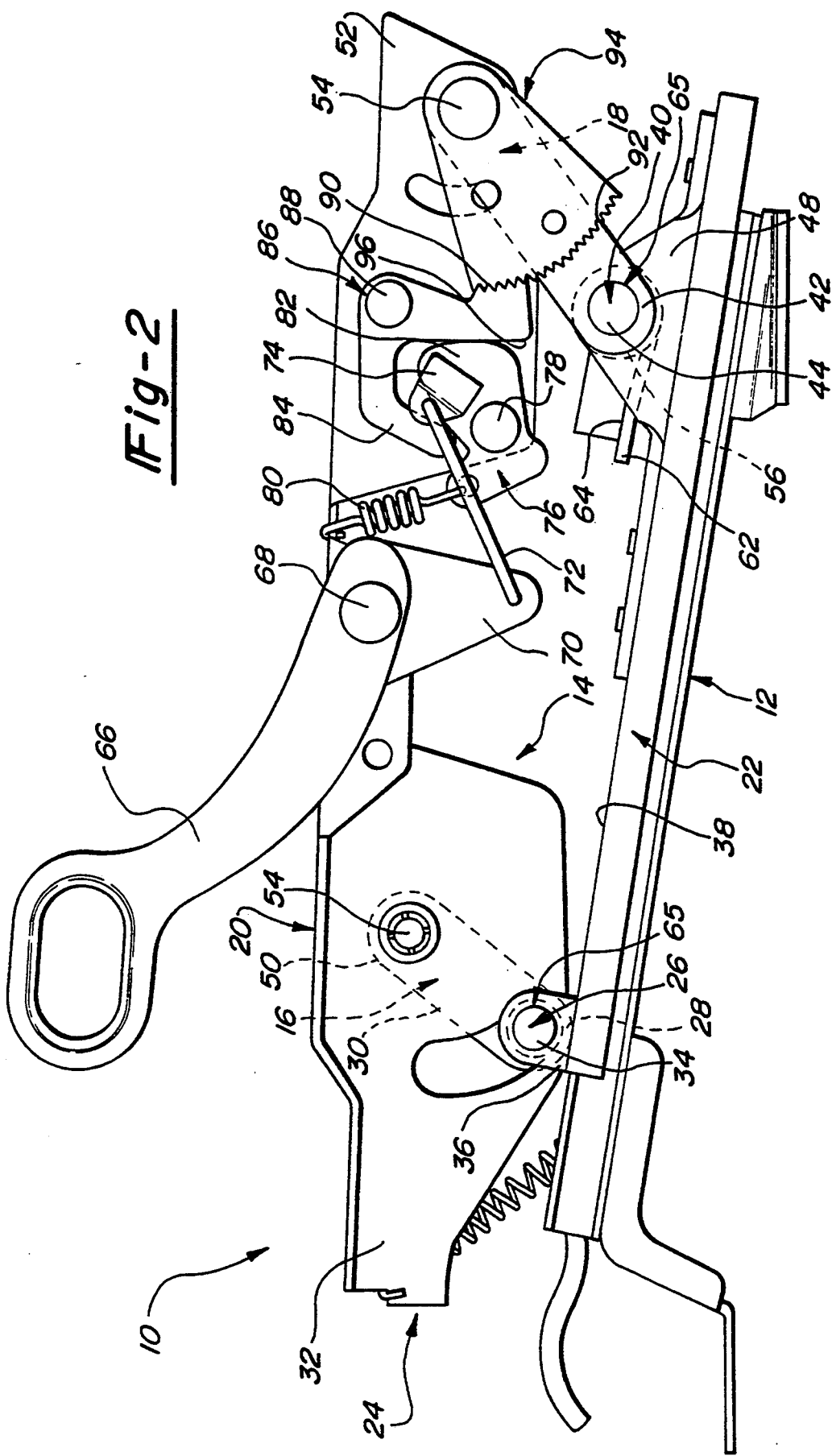
FIG. 2 is a side view of FIG. 1 illustrating the position adjusting/apparatus in the latched elevated forward position, with its helical coil spring retained in a substantially unloaded condition.
Figure 3:
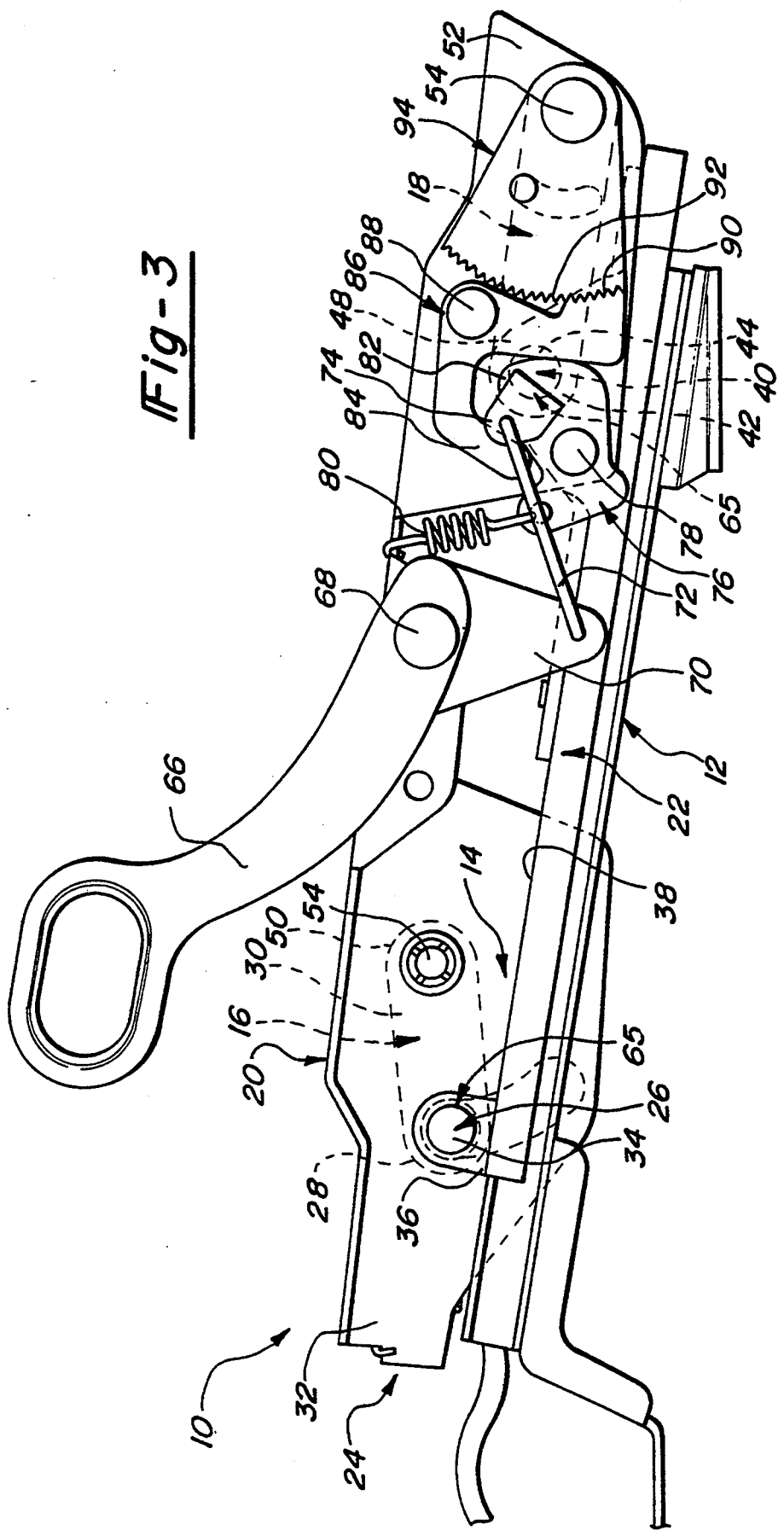
FIG. 3 is a side view, similar to FIG. 2, showing the position adjusting apparatus of the present invention latched in a lowered rearward position with its helical coil spring retained in a tensioned condition.

The upper ends 50 of the first pair of links 16 are pivotally coupled to forward portions 32 of upper mounting brackets 20. Likewise, upper ends 53 of the second pair of links 18 are pivotally coupled to rearward portions 52 of upper mounting brackets 20. As shown in FIG. 1, pivotal coupling of links 16 and 18 to upper mounting brackets 20 is by pins 54 or the like, however, one of ordinary skill in the art would recognize that any number of pivotal couplings could be utilized. As best shown in FIGS. 1, 2 and 3, pivotal attachment of first pair of links 16 and second pair of links 18 between upper mounting brackets 20 and lower sliding carriage rails 15 creates a classic four bar mechanism. This particular four bar mechanism 14 articulates between lowered rearward positions, as shown in FIG. 3, and elevated forward positions, as shown in FIG. 2.

As best shown in FIG. 1, a helical coil spring 56 surrounds rear crossbar 40 and is operatively associated with both rear crossbar 40 and rear bearing brackets 46 and 48. Accordingly, as four bar mechanism 14 is articulated from a forward raised position, as shown in FIGS. 1 and 2, to a lowered rearward position, as shown in FIG. 3, rear crossbar 40 rotates in a clockwise direction. As rearward crossbar 40 rotates clockwise, a post 58 extending radially from crossbar 40 engages an intermediate portion 60 of helical coil spring 56. Naturally, this causes intermediate portion 60 of spring 56 to rotate in a clockwise direction, however, distal tips 62 of helical coil spring 56 are engaged with notched portions 64 of rear bearing brackets 46 and 48 and are therefore held stationary. Thus, as upper mounting brackets 20 are articulated to a lowered rearward position, and rearward crossbar 40 rotates in a clockwise direction, helical coil spring 56 is tensioned. By tensioning coil spring 56, a portion of the energy exerted in lowering upper mounting brackets 20 is stored within spring 56. Note, helical coil spring 56 is preferably pretensioned even when vehicular seat 8 is in its most elevated position in order to counterbalance the weight of the seat itself.

Thereafter, when the occupant desires to raise vehicular seat 8 from a lowered rearward position to an elevated forward position, energy stored within coil spring 56 assists in lifting of vehicular seat 8. Tension within helical coil spring 56 urges intermediate portion 60 of spring 56 to rotate in a counterclockwise direction, thereby urging post 58 and rear crossbar 40 to rotate in a counterclockwise direction. As a result, the second pair of links 18 are also urged to rotate in a counterclockwise direction for causing upper bracket members 20 to elevate and move forward. Consequently, the combined weight of the occupant and vehicular seat 8 is lifted primarily by helical coil spring 56, without the aid of an elongated lever or an automated lifting system.

As best shown in FIGS. 2 and 3, the preferred embodiment of the present invention utilizes a second pair of links 18 having a length greater than the first pair of links 16. Thus, as vehicular seat 8 is moved from a lowered rearward position to an elevated forward position, rearward portion 52 of upper mounting bracket 20 moves a greater distance vertically upward than forward portion 32. This particular configuration is desirable since a relatively tall occupant generally prefers the seat to be adjusted toward a rearward lowered position and a relatively shorter occupant generally prefers the seat to be adjusted toward an elevated forward position. Common sense dictates that a shorter occupant prefers to be closer to the foot pedals and steering wheel while also being in a more elevated position to comfortably see over the dash. On the other hand, a taller seat occupant having a longer torso often prefers that the seat be lowered and rearward such that more leg room and head room is available. Accordingly, by manipulating the length of first pair of links 16 relative to second pair of links 18, optimal vertical and horizontal positioning of vehicular seat 8 can be accomplished for a wide variety of occupants with one simple adjustment operation.

As shown in FIG. 1, first pair of links 16 and second pair of links 18 may also be of an equal length such that four bar mechanism 14 is a parallelogram. In this configuration, the angular relationship between upper mounting brackets 20 and lower sliding carriage rails 15 remains constant while vehicular seat 8 is articulated between elevated forward positions and lowered rearward positions. Regardless of the configuration, slot 30 is utilized as a stopping mechanism to prevent first pair of links 16 from dropping below center with respect to four bar mechanism 14. In other words, the transversely extending axial axes of front crossbar 26 and rear crossbar 40 define the lower pivot points 65 in four bar mechanism 14. A reference plane that passes through both of these axes defines a "center" reference. When four bar mechanism 14 is articulated to the lower-most rearward position, slot 30 acts as a stop by engaging distal tip 34 of front crossbar 26 and locking four bar mechanism 14. At this lowermost position, upper pivot points 54 remain above the center reference plane. Thus, when vehicular seat 8 is returned from this lowermost position to an elevated forward position, first pair of links 16 are urged upward in a counterclockwise direction and are not permitted to cross over center and rotate downwardly causing the linkage to jam.

Note that four bar mechanism 14 can be configured such that the second pair of links 18 drop below center in a lowered rearward position. In other words, four bar mechanism 14 can be configured such that when lowered,-rear upper pivot points 54 of second pair of links 18 rotate below the center reference plane while front upper pivot points 54 of first pair of links 16 are limited by slot 30 to remain above the center reference plane. This type of configuration permits rearward end 52 of upper mounting brackets 20 to be lowered a much greater degree than forward end 32 of upper mounting brackets 20, which is sometimes desirable.

Figure 4:
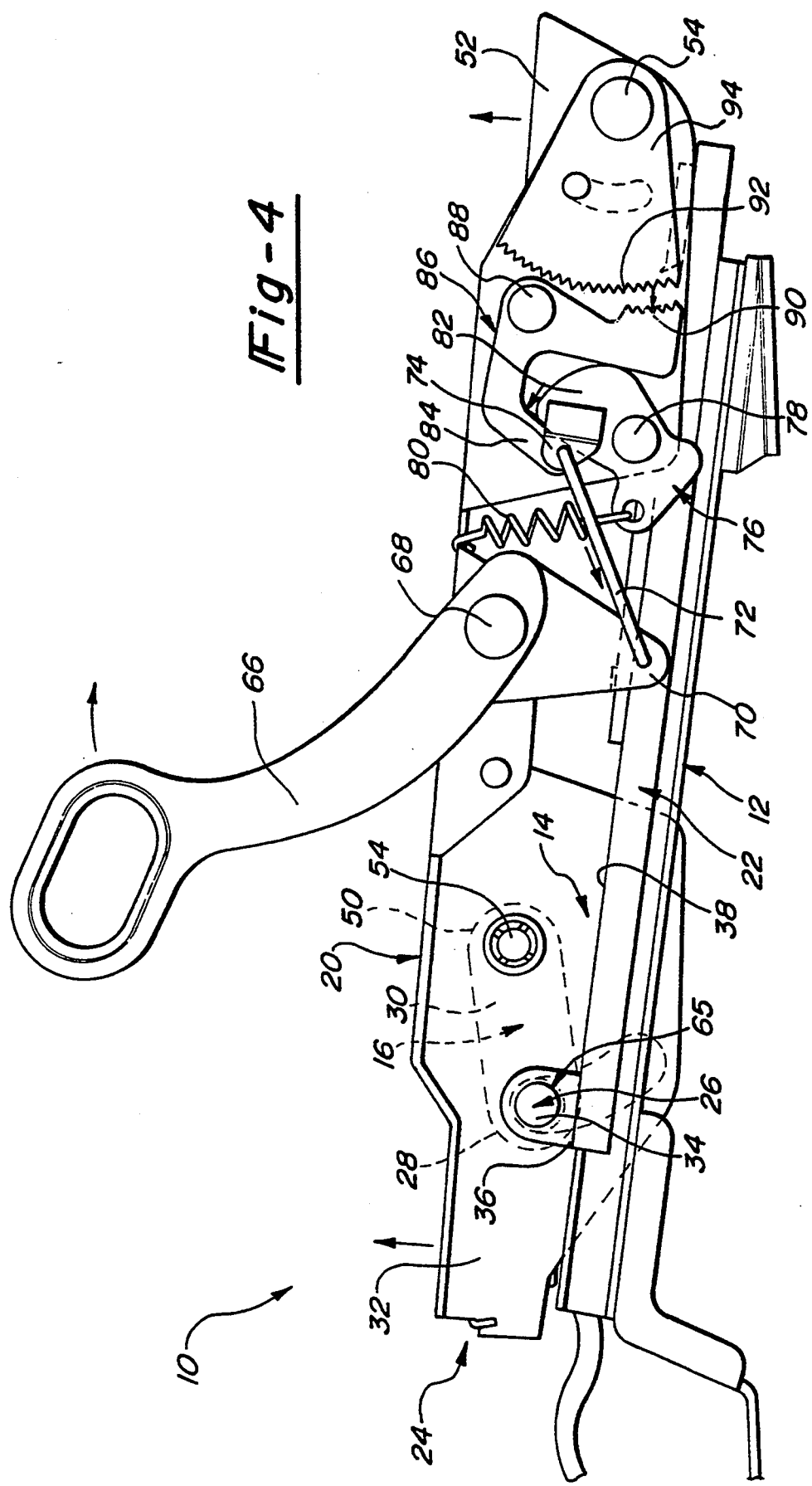
FIG. 4 is a side View, similar to FIG. 2, illustrating the release handle articulated to a disengaged position such that the latch pawl is disengaged from the toothed sector, thereby permitting tension within the coil spring to urge the position adjusting apparatus from the lowered rearward position toward the elevated forward position in accordance with the principles of the present invention.

In operation, position adjusting apparatus 10 of the present invention is utilized as follows. When vehicular seat 8 is in a lowered rearward position, and an occupant desires to articulate the seat assembly to an elevated forward position, the occupant grasps latch handle 66 and moves it in a rearward direction as shown in FIG. 4. Latch handle 66 pivots about a first pivot member 68 causing a lower portion 70 of latch handle 66 to articulate forwardly. As a result, a connecting rod 72 secured to lower portion 70 of latch handle 66 also moves in a forward direction. The opposite end of connecting rod 72 is secured to an ear 74 extending from a cam member 76. Thus, as connecting rod 72 is moved forwardly, ear 74 extending from cam member 76 is also moved forwardly, causing it to pivot about a second pivot member 78 against the reactive force of a return spring 80. As cam member 76 is pivoted, an upper lobe 82 cams an outer finger 84 of a latch pawl 86 generally forwardly. As a result, latch pawl 86 pivots about a third pivot member 88 such that a toothed portion 90 of latch pawl 86 is also articulated forwardly and out of engagement with a corresponding toothed portion 92 of a sector 94. Once latch pawl 86 has disengaged toothed segment 92, four bar mechanism 14 is free to incrementally articulate between the elevated forward positions and lowered rearward positions. Note that toothed sector 94 is preferably affixed to one of rear links 18 for simplicity, however, one of ordinary skill in the art would recognize that other links or portions of vehicular seat 8 could be utilized to mount toothed sector 94 or another type of latch altogether could be utilized.

After latch pawl 86 disengages toothed segment 94, the occupant can incrementally adjust vehicular seat 8 to an elevated forward position by simply leaning slightly forward and/or slightly lifting the occupant's weight from vehicular seat 8. Once the desired position has been achieved, the occupant simply releases latch handle 66 thereby permitting return spring 80 to rotate cam member 76 to an engaged position. As shown in FIG. 2, in this engaged position, upper lobe 82 positively displaces toothed portion 90 of latch pawl 86 into engagement with corresponding toothed portion 92 of sector 94. Note, as shown in both FIGS. 2 and 3, upper lobe 82 of cam member 76 directly abuts a rear surface 96 of toothed portion 90 on latch pawl 86 such that latch pawl 86 is affirmatively locked with toothed portion 92 of sector 94. Likewise, in order to move the unlatched vehicular seat 8 from an elevated forward position to a lowered rearward position, the occupant can simply press slightly against the seat back member (not shown) of the seat assembly to create a load sufficient to overcome helical coil spring 56 and lower vehicular seat 8. As a result, four bar mechanism 14 articulates to a lowered rearward position and a portion of the overall energy exerted is stored in helical coil spring 56.

In short, the present invention provides a unique position adjustment apparatus 10 which allows an occupant to quickly and easily adjust vehicular seat 8 both horizontally and vertically. These adjustments are accomplished with very little effort and eliminate the need for an elongated lever or a complicated automated lifting mechanism. The present invention further provides a helical coil spring 56 for storing a portion of the energy exerted while lowering vehicular seat 8 and thereafter using that energy to assist lifting both the weight of vehicular seat 8 and the occupant to an elevated position. In addition, four bar mechanism 14 can be configured such that first pair of links 16 and second pair of links 18 are of varying lengths with respect to one another, thereby controlling the precise path of articulation of vehicular seat 8. Thus, four bar mechanism 14 can be configured for optimal positioning of a wide variety of occupants with a single vertical and horizontal adjustment operation.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. A position adjusting apparatus for a vehicular seat, comprising:
   a) a base;
   b) a mounting bracket having a forward portion and a rearward portion for mounting a vehicular seat thereto;
   c) a four bar mechanism extending from said base for supporting said vehicular seat, said four bar mechanism adapted for articulation with respect to said base such that said forward and rearward portions of said mounting bracket can be moved concurrently between elevated forward positions and lowered rearward positions;
   d) means for storing a portion of the energy exerted as said vehicular seat is lowered from said elevated forward positions to said lowered rearward positions such that said stored energy can be utilized to assist elevating said seat from said lowered rearward position to said elevated forward position, said means for storing said energy being disposed between two members of said four bar mechanism; and
   e) latch means selectively positionable for prohibiting articulation of said four bar mechanism and for permitting articulation of said four bar mechanism.

2. The position adjusting apparatus of claim 1 wherein said four bar mechanism comprises:
   a first pair of links coupled to one another,
   a second pair of links coupled to one another,
   a portion of said mounting bracket extending between a first end of each of said first pair of links and a first end of each of said second pair of links, and
   said base extending between a second end of each of said first pair of links and a second end of each of said second pair of links, whereby said seat is articulated between said lowered rearward positions and said elevated forward positions by articulating said first and second pairs of links with respect to said base.

3. The position adjusting apparatus of claim 2 wherein said first pair of links is longer than said second pair of links.

4. The position adjusting apparatus of claim 2 wherein said first pair of links and said second pair of links are of equal length.

5. The position adjusting apparatus of claim 1 wherein said means for storing a portion of the energy exerted as said vehicular seat is lowered is a helical coil spring, said helical coil spring surrounding a transversely extending bar that integrally extends between one pair of links within said four bar mechanism, a first portion of said helical coil spring operatively engaging a portion of said bar, and second portion of said helical coil spring operatively engaging a portion of said base, such that as said seat is moved from said elevated forward positions to said lowered rearward positions, said helical coil spring is tensioned, thereby storing a portion of the energy exerted, said energy utilized for assisting lifting of said seat from said lowered rearward positions to said elevated forward positions.

6. The position adjusting apparatus of claim 1 wherein said four bar mechanism is configured such that as said seat is moved to said lowered rearward position, a rearward portion of said seat moves further vertically downward than a front portion of said seat and when said seat is moved from its lowered rearward position to said elevated forward position, said rear portion of said seat moves further vertically upwardly than said front portion of said seat.

7. A position adjusting apparatus for a seat within an automotive vehicle, said apparatus comprising:
   a) a base operably associated with a portion of said vehicle;
   b) at least one bracket having a forward portion and a rearward portion for supporting a cushioned portion of said seat;
   c) a first pair of links extending between, and operatively associated with, portions of said base and said bracket such that said links articulate with respect to both said base and said bracket, said links being transversely spaced from one another;
   d) a second pair of links extending between, and operatively associated with, portions of said base and said bracket such that said links articulate with respect to both said base and said bracket, said second pair of links being transversely spaced from one another and longitudinally spaced from said first pair of links such that said base, said bracket and said first and second pairs of links define a four bar mechanism capable of articulation whereby said forward and rearward positions of said bracket are moved concurrently both vertically and horizontally; and
   e) a spring operatively associated with at least one of said links and with said base such that when an occupant adjusts said seat vertically downwardly, and said links are articulated with respect to said base, said spring is tensioned, and when an occupant adjusts said seat vertically upwardly, tension within said spring is used to assist lifting of said seat and said occupant therein as said spring relaxes; and
   f) latch mechanism coupled to said four bar mechanism and positionable between a first position for engaging said four bar mechanism to prohibit articulation thereof and a second position for disengaging said four bar mechanism to permit articulation thereof.

8. The position adjusting apparatus of claim 7 wherein a transversely extending rigid member is operatively associated with each of said second pair of links such that said rigid member rotates with respect to said base as said second pair of links are articulated.

9. The position adjusting apparatus of claim 8 wherein said spring is a helical coil spring surrounding said rigid member and wherein a first portion of said spring is operatively associated with said rigid member and a second portion of said spring is operatively associated with said base such that as said rigid member rotates with respect to said base, said helical coil spring is tensioned or relaxed.

10. The position adjusting apparatus of claim 7 wherein said first and second pairs of links are of equal length and parallel to one another such that said four bar mechanism is a parallelogram and an angular relationship between said base and said bracket is maintained as said four bar mechanism is articulated.

11. The position adjusting apparatus of claim 7 wherein said first pair of links is of a length shorter than said second pair of links such that as said seat is adjusted vertically downwardly, a rear portion of said seat moves a greater distance vertically downwardly than a front portion of said seat.

12. The position adjusting apparatus of claim 7 wherein said first pair of links is pivotally coupled to said base through a common pivot axis and said second pair of links is pivotally coupled to said base at a second common pivot axis such that a plane passing through both said first and second pivot axes is defined, both said first and second pairs of links extending upwardly from said plane when said seat is in a vertically elevated position, said second pair of links extending generally downwardly from said plane when said seat is in a lowered position.

13. A position adjusting apparatus for a seat within an automotive vehicle, said apparatus comprising:
   a) a base operably associated with a portion of said vehicle;
   b) a bracket having a forward portion and a rearward portion for supporting a cushioned portion of said seat;
   c) a first pair of links extending between, and operatively associated with, portions of said base and said bracket such that said links articulate with respect to both said base and said bracket, said links being transversely spaced from one another;
   d) a second pair of links extending between, and operatively associated with, portions of said base and said bracket such that said links articulate with respect to both said base and said bracket, said second pair of links being transversely spaced from one another and longitudinally spaced from said first pair of links such that said base, said bracket and said first and second pairs of links define a four bar mechanism capable of articulating whereby said forward and rearward portions of said bracket are moved concurrently both vertically and horizontally with respect to said base;
   e) a transversely extending rigid member that extends between one of said pairs of links, said rigid member being integral with said pair of links;
   f) a helical coil spring surrounding said rigid member, a first portion of said spring being operatively associated with said base and a second portion of said spring being operatively associated with said rigid member such that as said bracket is articulated vertically downwardly, said spring is tensioned and as said bracket is articulated vertically upwardly, said spring relaxes, thereby assisting lifting of the seat and an occupant therein; and
   g) a latch mechanism pivotally coupled to said bracket and positionable between a first position for engaging at least one of said second pair of links to prohibit articulation of said four bar mechanism and a second position for disengaging said at least one of said second pair of links to permit articulation of said four bar mechanism.

14. The position adjusting apparatus of claim 13 wherein said first pair of links and said second pair of links are of equal length and oriented parallel to one another such that as said four bar mechanism articulates, said bracket maintains a constant angular relationship with respect to said base.

15. The position adjusting apparatus of claim 13 wherein said first pair of links are of a length shorter than said second pair of links such that as said four bar mechanisms is articulated, an angular relationship between said bracket and said base varies.

16. The position adjusting apparatus of claim 13 wherein one end of each of said first and second pairs of links is pivotally coupled to said base such that a plane passing through a pivotal axis for each of said pivotal couplings provides a reference for said four bar linkage whereby said first pair of links extends upwardly from said plane when said seat is in both raised and lowered positions, and said second pair of links extends generally upwardly from said plane when said seat is in a raised position and generally downwardly from said plane when in a lowered position.

17. The position adjusting apparatus of claim 13 wherein said first pair of links is disposed at a forward portion of said seat and said second pair of links is disposed at a rearward portion of said seat.

* * * * *